(12) United States Patent
Takahashi

(10) Patent No.: US 12,716,992 B2
(45) Date of Patent: Aug. 25, 2026

(54) SYSTEM AND METHOD FOR GENERATING TRANSMITTED SIGNALS OF A STEPPED FREQUENCY CONTINUOUS WAVE RADAR

(71) Applicant: Geophysical Survey Systems, Inc., Nashua, NH (US)

(72) Inventor: Kazunori Takahashi, Saitama (JP)

(73) Assignee: Geophysical Survey Systems, Inc., Nashua, NH (US)

( * ) Notice: Subject to any disclaimer, the term of this patent is extended or adjusted under 35 U.S.C. 154(b) by 356 days.

(21) Appl. No.: 18/466,056

(22) Filed: Sep. 13, 2023

(65) Prior Publication Data

US 2025/0085387 A1 Mar. 13, 2025

(51) Int. Cl.
*G01S 7/35* (2006.01)
*G01S 7/02* (2006.01)

(52) U.S. Cl.
CPC .............. *G01S 7/35* (2013.01); *G01S 7/0232* (2021.05)

(58) Field of Classification Search
CPC ................................ G01S 7/35; G01S 7/0232
See application file for complete search history.

(56) References Cited

U.S. PATENT DOCUMENTS 6,140,822 A * 10/2000 Williams .............. G01R 31/58 324/626
11,366,197 B2 * 6/2022 Leabman ............. G01S 7/0234
2009/0273507 A1 * 11/2009 Niedzwiecki ........... G01S 7/032 342/146
2014/0066767 A1 * 3/2014 Mammone ........... A61B 8/0825 600/443
2016/0139259 A1 * 5/2016 Rappaport .......... G01S 13/0209 342/21
2017/0102457 A1 * 4/2017 Li ............................ G01S 7/10
2017/0187198 A1 * 6/2017 Leabman ............ H02J 13/1335
2018/0196134 A1 * 7/2018 Safavi-Naeini ....... G01S 13/887
2018/0348341 A1 * 12/2018 Phelan .................... G01S 7/023
2020/0107249 A1 * 4/2020 Stauffer ................ H04W 48/14
2020/0191945 A1 * 6/2020 Leabman ................ G01S 7/282
2025/0138182 A1 * 5/2025 Lehner .................. G01S 13/885

* cited by examiner

*Primary Examiner* — Marcus E Windrich
(74) *Attorney, Agent, or Firm* — Michael J. Feigin, Esq.; Feigin and Fridman LLC

(57) ABSTRACT

A stepped frequency (SF) radar system includes a multi-channel radio frequency (RF) transceiver, a transmitting antenna, a receiving antenna, and a processor. The transmitting antenna transmits output signals from the multi-channel RF transceiver, which output signals include a plurality of signal scans. Each signal scan includes multiple output signals each having a specific frequency selected from a predetermined group of frequencies. The receiving antenna provides to the multi-channel RF transceiver input signals received thereby. The controller controls generation of the output signals to be transmitted by the multi-channel RF transceiver, and processes the input signals provided by the multi-channel RF transceiver. The controller includes a stepping modification module for randomizing an order of the output signals, within at least one of the plurality of signal scans, in order to reduce or prevent interference in the output signals.

19 Claims, 7 Drawing Sheets

SYSTEM AND METHOD FOR GENERATING TRANSMITTED SIGNALS OF A STEPPED FREQUENCY CONTINUOUS WAVE RADAR

FIELD OF THE DISCLOSED TECHNOLOGY

The disclosed technology relates generally to stepped frequency radar systems and methods of operation thereof. More specifically, the disclosed technology relates randomizing at least one parameter of a sequence of frequency sweeps to mitigate or prevent interference with other similar systems operating in close proximity.

BACKGROUND OF THE DISCLOSED TECHNOLOGY

Stepped Frequency Continuous Wave (SFCW) radar traditionally transmits and receives a continuous wave at a first frequency and repeats the transmission operation with subsequent frequencies, "stepping" through the subsequent frequencies in order. This enables measurement of complex reflection coefficients at various frequencies from which the impulse response of the scene can be reconstructed. This type of step can also be represented mathematically, where the n-th frequency $f_n$ is given by:

$$f_n = f_0 + n\Delta f$$

where $f_0$ is the first frequency and $\Delta f$ is the step size. A graphic representation of a frequency sweeping sequence of such a prior art sequential step sweeping radar is shown in FIG. 1. The operation may be repeated for obtaining spatial or temporal variation in the scene. More complex methods of stepped frequency radars like OFDM (Orthogonal Frequency Division Multiplexing), Chirp and FMCW (Frequency Modulated Continuous Wave) would also find benefit from this disclosed technology.

In case there is another unit of the same radar in close proximity operating in the same way and at the same rate of the repetition, the radars may interfere with each other when the frequency sweeps accidentally synchronize. Since the two radars are operating at the same repetition rate, the radars stay synchronized and keep interfering with each other. Since stepped frequency radars traditionally transmit uncoded sinusoidal waves, it is not possible to distinguish the origin transmitter of each signal component after the signals are received. The interference yields a mixture of signals from multiple sources and results in unsuccessful measurements for both radar units. Such interference is a rather serious issue if, for example, an array radar system is configured using multiple RF transceiver chips working asynchronously.

Various methods of frequency stepping SFCW radars have been proposed in the prior art. For example, frequency hopping by a frequency multiplier has been proposed. As another example, a phase locked loop was used when generating the signals.

There remains a need in the art for systems and methods for effectively and efficiently preventing interference between two Step Frequency radars working in close proximity.

SUMMARY OF THE DISCLOSED TECHNOLOGY

The disclosed technology relates generally to stepped frequency radar systems and methods of operation thereof.

More specifically, the disclosed technology relates randomizing at least one parameter of a frequency sweeping sequence to mitigate or prevent interference with other units of the same radar system operating in close proximity.

In accordance with an aspect of the disclosed technology, there is provided a stepped frequency (SF) radar system, including a multi-channel radio frequency (RF) transceiver. The SF radar system further includes a transmitting antenna transmitting a plurality of output signals from the multi-channel RF transceiver, the plurality of output signals including a plurality of frequency sweeps, each frequency sweep including multiple output signals each having a specific frequency selected from a predetermined group of frequencies. The SF radar system a receiving antenna providing to the multi-channel RF transceiver input signals received thereby. A controller, forming part of the SF radar system, controls generation of the output signals to be transmitted by the multi-channel RF transceiver, and processes the input signals provided by the multi-channel RF transceiver. The controller includes a stepping modification module for randomizing an order of the multiple output signals having frequencies from the predetermined group of frequencies, within at least one of the plurality of frequency sweeps, in order to reduce or prevent interference in the multiple output signals.

In some embodiments, the multi-channel RF transceiver includes, in at least one channel: a digital to analog (D/A) converter sampling a baseband signal generated by the controller; a transmitter local oscillator generating an oscillator signal; and a mixer mixing the baseband signal with the oscillator signal to up-convert the baseband signal generated by the controller to an RF frequency, the combiner providing the up-converted signal to the transmitting antenna for transmission thereof.

In some embodiments, the multi-channel RF transceiver includes, in at least one channel: a mixer mixing an RF input signal received by the receiving antenna with a signal provided by a receiver local oscillator to down-convert the received RF input signal to a baseband signal; a filter filtering the baseband signal; and an analog to digital (A/D) converter sampling the baseband signal and providing the sample to the controller.

In some embodiments, in a data channel of the multi-channel RF transceiver, the RF input signal received by the receiving antenna includes reflections from targets at which the transmission from the transmitting antenna was directed.

In some embodiments, in a reference channel of the multi-channel RF transceiver, the input signal includes the signal directly routed from the RF output of the RF transceiver.

In some embodiments, the stepping modification module randomizes the order once to generate a randomized order, and the randomized order is used in each of the plurality of frequency sweeps.

In some embodiments, the controller reduces or mitigates interference from signals from a second SF radar system, and wherein the stepping modification module communicates with the second SF radar system to ensure that the randomized order is different from an order generated by the second SF radar system.

In some embodiments, the stepping modification module additionally adds a random delay duration between two adjacent frequency sweeps of the plurality of frequency sweeps.

In some embodiments, the stepping modification module adds the random delay duration between each pair of adjacent frequency sweep of the plurality of frequency sweeps.

In some embodiments, the controller detects interference with signals received by the receiving antenna, and the stepping modification module adds the random delay duration between a single pair of adjacent frequency sweeps of the plurality of frequency sweeps, in response to the controller detecting the interference.

In some embodiments, the controller deactivates the transmitting antenna during detection of the interference, and reactivates the transmitting antenna following addition of the random delay duration.

In some embodiments, the stepping modification module additionally sets a random initial phase shift for the plurality of signals transmitted by the transmitting antenna, and wherein during processing of received signals, the controller eliminates the random initial phase shift of signals generated by the system and does not eliminate any phase shift of interference signals, thereby rendering the interference signals incoherent.

In accordance with another aspect of the disclosed technology, there is provided a method for preventing interference between signals of a stepped frequency (SF) radar system and signals of another radar system. The method includes generating a randomized order of frequencies in a predetermined group of frequencies to be used by output signals of the SF radar system; transmitting a plurality of output signals from a multi-channel RF transceiver of the SF radar system, the plurality of output signals including a plurality of frequency sweeps, each frequency sweep including multiple output signals having frequencies selected from the predetermined group of frequencies in accordance with the randomized order; receiving at the multi-channel RF transceiver a plurality of RF input signals; and processing the RF input signals provided by the multi-channel RF transceiver.

In some embodiments, the receiving includes, in a data channel of the multi-channel RF transceiver, receiving as the plurality of RF input signals a plurality of reflections from targets at which the transmitted RF output signals were directed.

In some embodiments, the receiving includes, in a reference channel of the multi-channel RF transceiver, receiving as the plurality of RF input signals the RF output signals of the multi-channel RF transceiver.

In some embodiments, the method further includes communicating with another radar unit of the same system to ensure that the randomized order is different from a frequency order generated by another radar unit of the same system.

In some embodiments, the method further includes adding a random delay duration between two adjacent frequency sweeps of the plurality of frequency sweeps.

In some embodiments, the adding includes deactivating transmission of the RF output signals, detecting interference in signals received by the receiving antenna, adding the random delay duration between a single pair of adjacent frequency sweeps of the plurality of frequency sweeps, in response to detecting the interference, and reactivating transmission of the RF output signals following addition of the random delay duration.

In some embodiments, the method further includes setting a random initial phase shift for the transmission of the plurality of signals and during the processing of the received RF input signals, eliminating the random initial phase shift of signals generated by the SF radar system and not eliminating any phase shift of interference signals, thereby rendering the interference signals incoherent.

DETAILED DESCRIPTION OF EMBODIMENTS OF THE DISCLOSED TECHNOLOGY

The disclosed technology relates generally to stepped frequency radar systems and methods of operation thereof. More specifically, the disclosed technology relates randomizing at least one parameter of a sequence of frequency steps to mitigate or prevent interference with other units of the same radar system operating in close proximity.

Embodiments of the disclosed technology will become clearer in view of the following description and in view of the drawings.

A stepped frequency (SF) radar system in accordance with the disclosed technology includes a multi-channel radio frequency (RF) transceiver, a transmitting antenna, a receiving antenna, and a processor. The transmitting antenna transmits a plurality of RF output signals from the multi-channel RF transceiver, which output signals include a plurality of frequency sweeps. Each frequency sweep includes multiple RF output signals each having a specific frequency selected from a predetermined group of frequencies. The receiving antenna provides to the multi-channel RF transceiver input signals received thereby. The controller controls generation of the RF output signals to be transmitted by the multi-channel RF transceiver, and processes the input signals provided by the multi-channel RF transceiver. The controller includes a stepping modification module for randomizing an order of the multiple RF output signals having frequencies from the predetermined group of frequencies, within at least one of the plurality of frequency sweeps, in order to reduce or prevent interference in the multiple output signals.

Figure 2:
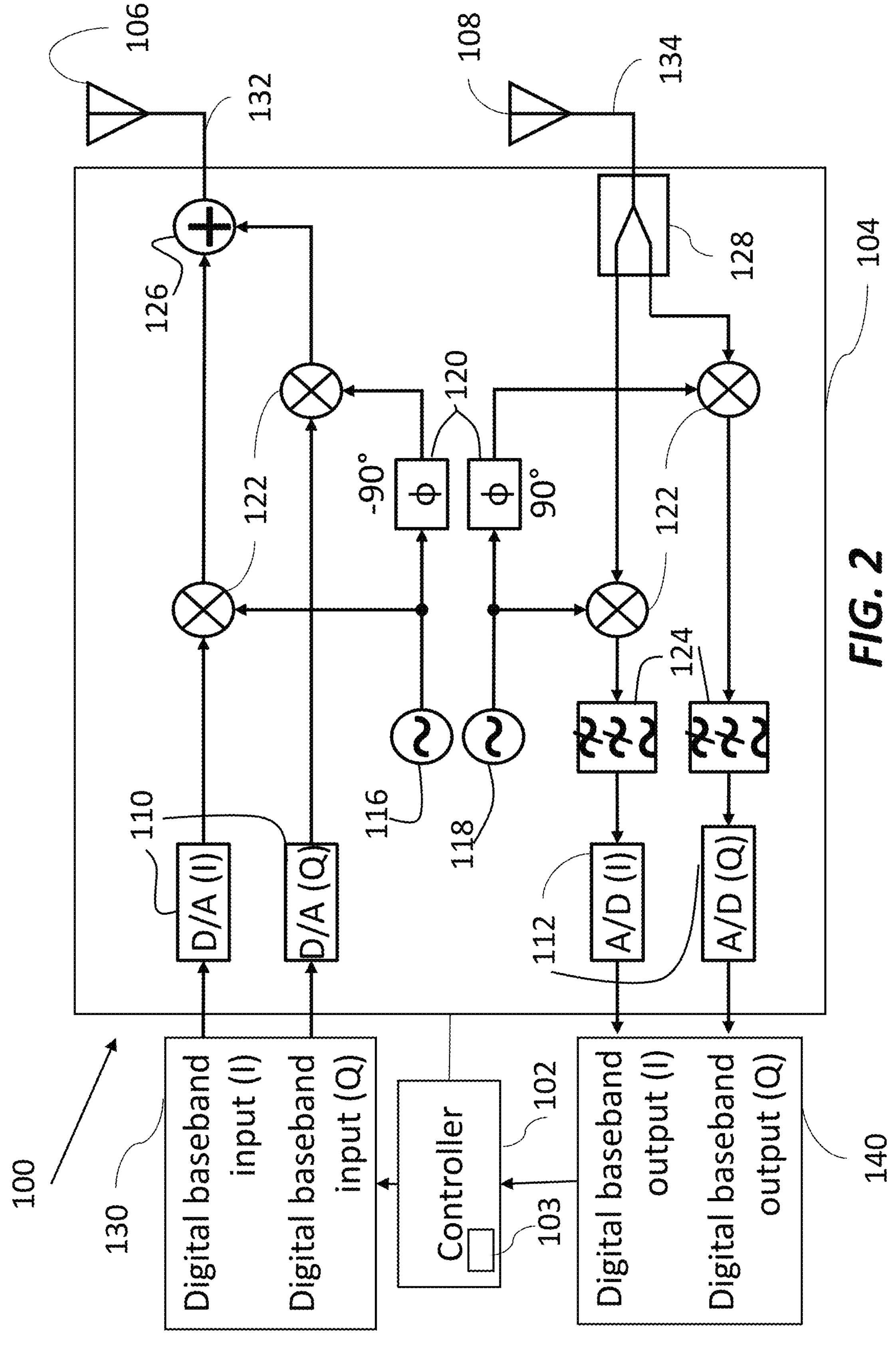
FIG. 2 is an example of a block diagram of an SF radar system according to embodiments of the disclosed technology.

FIG. 2 is a block diagram of a Stepped Frequency (SF) radar system 100 according to embodiments of the disclosed technology. SF radar system 100 may, for example, be or include a ground penetrating radar (GPR) system.

SF radar system 100 includes a controller 102, a multi-channel RF transceiver 104, a transmitting (Tx) antenna 106, and a receiving (Rx) antenna 108. For each channel, RF transceiver 104 includes a digital to analog (D/A) converter 110, an analog to digital (A/D) converter 112, one or more transmitting (Tx) local oscillators 116, and one or more receiving (Rx) local oscillators 118. RF transceiver 104 may further include one or more phase shifters 120, one or more I/Q mixers 122, and may include one or more filters 124, a combiner 126, and a splitter 128. FIG. 2 illustrates a single channel of RF transceiver 104, but it is to be appreciated that additional channels have a similar structure.

RF transceiver 104 receives digital baseband I/Q signals 130, generated by controller 102, for example using a direct digital synthesis (DDS). RF transceiver outputs digital baseband I/Q signals 140, which are processed by controller 102 to reconstruct time-domain pulsed responses.

In a channel (hereafter called the data channel) of RF transceiver 104, the input baseband signal 130 digitally generated by controller 102 is sampled by the D/A converter 110, mixed by a mixer 122 with a signal provided from a Tx local oscillator 116. A portion of the oscillator signal is phase shifted by a phase shifter 120, to match the quadrature (Q) portion of the baseband signal. The mixed baseband signals are combined by combiner 126 to form RF signal 132. The combined RF signal 132 is transmitted by Tx antenna 106.

Rx antenna 108 receives reflections 134 from targets, which are split into Q and in-phase (I) signals by splitter 128. The signals are then mixed by a mixer 122 with a signal provided from Rx local oscillator 118 that down-converts the received reflection signals to a baseband frequency. The down-converted baseband signal is filtered by low pass filters 124 and sampled by the A/D converter 112, to form a digital baseband I/Q output signal 140.

It is to be appreciated that the signals of oscillators 116 and 118 have a relatively high frequency (e.g. a few tens of MHz up to a few GHz in the case of used in a GPR system), and are controllable.

Baseband signals 130 are also input to a reference channel, which works in the same way as the data channel, other than its Tx and Rx ports being directly connected, such that the signal received by the Rx antenna of the reference channel is identical to the signal output by the Tx antenna of the reference channel.

The data channel and reference channel work synchronously and sample signals simultaneously. The Tx local oscillator 116 and the Rx local oscillator 118 may be different from each other, but are shared between the data and reference channels. In some embodiments, RF transceiver 104 may include additional filters, amplifiers, attenuators and other components, which may be involved in the Tx and Rx paths to condition input and output signals.

The digital baseband I/Q output signals 140 of both channels are processed in controller 102 for example using the following steps:

(a) I/Q samples of the output signal of the data channel are divided by those of the reference channel, thereby down-converting the baseband signal of the data channel to DC and eliminating the initial phases of the Tx and Rx local oscillator signals. This may be accomplished alternatively by multiplying the complex conjugate (i.e. negating the Q component) of the I/Q samples of the reference channel.

(b) The down-converted signal samples are averaged or decimated to obtain one I/Q value that corresponds to the complex reflection coefficient at the frequency transmitted by Tx antenna 106, i.e. the sum of the frequencies of the Tx baseband signal and the Tx local oscillator signal.

(c) By stepping the frequencies of the Tx and Rx local oscillator signals across a certain frequency range with a certain frequency step, complex reflection coefficients within the frequency range are collected.

(d) The time-domain response, which corresponds to radar pulse, is then obtained by calculating the inverse Fourier transform of the complex reflection coefficients received by Rx antenna 108.

Figure 1:
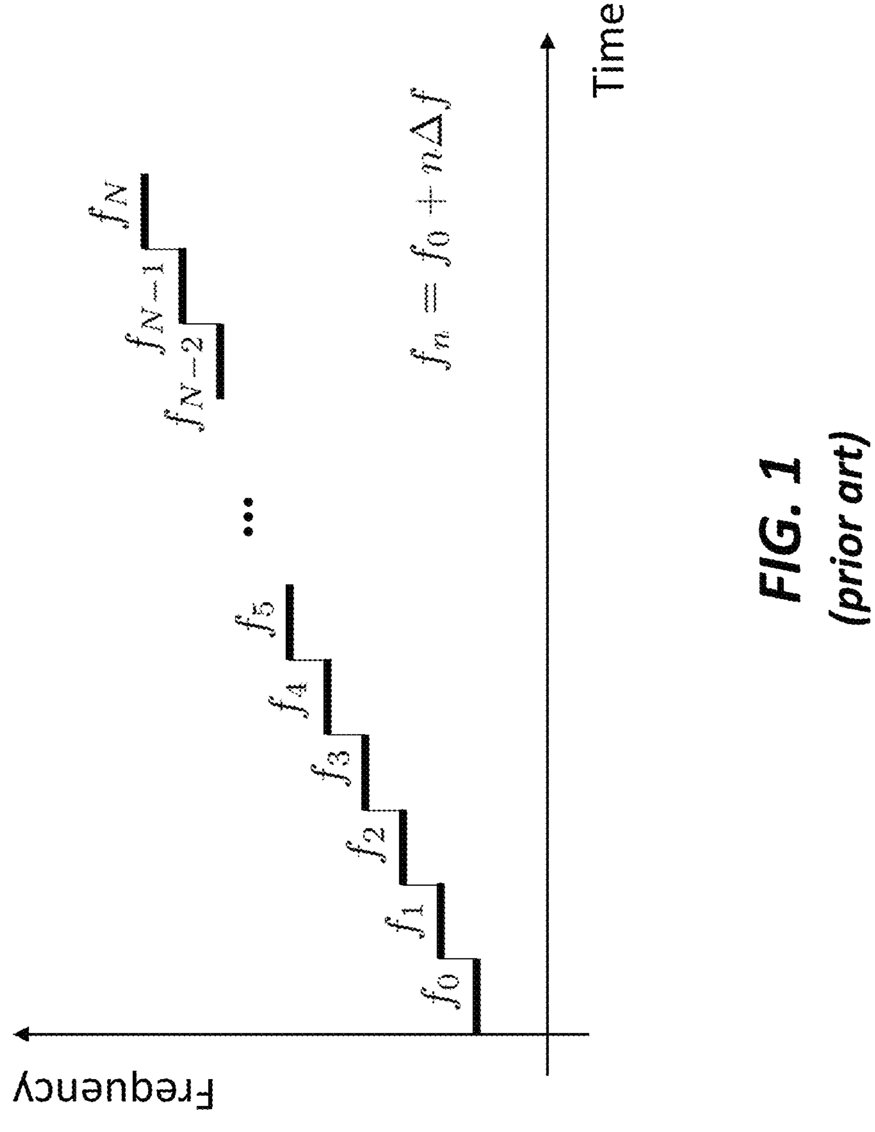
FIG. 1 (PRIOR ART) is a graphic representation of a frequency stepping sequence of a prior art Stepped Frequency (SF) radar system.

In SF radar system 100, as well as in prior art SF radar systems, controller 102 can control the frequency of the signals of Tx local oscillator 116 and of Rx local oscillator 118. These oscillator signals may be based on RF synthesizers using a phase-locked loop (PLL), so that the transmit and receive frequencies can be set arbitrarily. In the prior art, SF radar systems increase the frequency f sequentially by a set step size $\Delta f$, as shown in FIG. 1 and as described hereinabove. Consequently, frequencies to be stepped to are predefined as discrete frequencies with a constant step. Use of discrete known increasing frequency steps is advantageous because the complex reflection coefficients need to be arranged in memory in frequency ascending order to apply the inverse Fourier transform (at step d hereinabove) for pulse reconstruction.

However, as mentioned hereinabove, when multiple units of the same stepped frequency radar are operating in close proximity, they may transmit and receive at the same frequency, i.e. be synchronized. As such, the signals from one radar unit would interfere with the signals from the other radar unit, although the two units are not communicating with each other and are operating independently. The problem is compounded by the fact that once synchronized, the two units remain synchronized and continue to interfere with each other, since they operate the same way at the same frequency scan rate.

Figure 3:
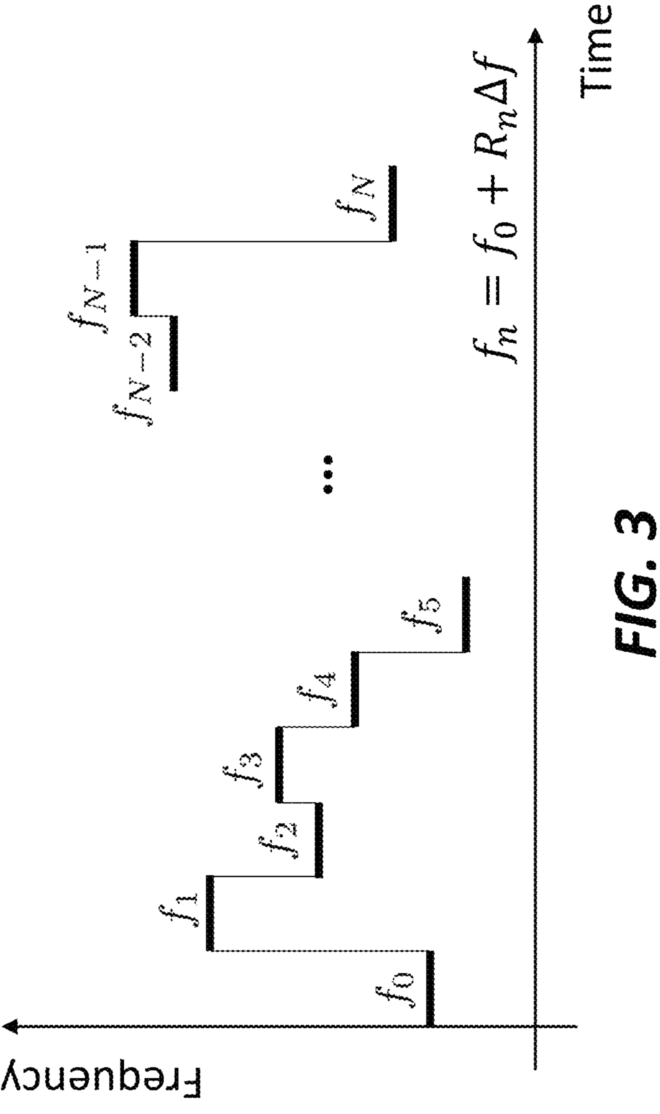
FIG. 3 is a graphic representation of a frequency stepping sequence of the SF radar according to embodiments of the disclosed technology.

In accordance with the disclosed technology, controller 102 includes a stepping modification module 103, which modifies the stepping protocol as described in further detail hereinbelow, in order to reduce, mitigate or prevent interference with the signals of SF system 100. As explained hereinbelow, the stepping modification module 103 may facilitate modifying or randomizing any one or more of:

the order in which various frequency steps are carried out;
the delay between frequency sweeps;
the sweep timing.
the initial phase set for the baseband signals; and/or In accordance with embodiments of the disclosed technology, one method for reducing or preventing interference between the signals of SF radar system 100 and another radar system is by modifying the order in which the frequency hops between the predetermined frequency steps. An example of such a signal is provided in FIG. 3, which is a graphic representation of a frequency sweep sequence of the SF radar. The frequencies illustrated in FIG. 3 uses the same step frequencies $f_1$ to $f_N$ used in FIG. 1, but the steps are arranged in a different, randomized, order.

A randomized frequency hopping sequence is generated by stepping modification module 103 of controller 102, which causes the frequencies of Tx local oscillator(s) 116 and Rx local oscillator(s) 118 to be hopped accordingly. Controller 102 (or module 103 thereof) retain a reference to the way in which the sequence was randomized, enabling controller 102 to rearrange the collected complex reflection coefficients in frequency ascending order for calculation of the inverse Fourier transform. For example, the n-th frequency in the randomized frequency hopping may be given by:

$$f_n = f_0 + R_n \Delta f$$

where $f_0$ is the first frequency, $\Delta f$ is the step size, n is the current step number (i.e. 0, 1, 2, . . . , N) and $R_n$ is the n-th random variable R where $R \in [0, N]$.

Because of the large size of the number of steps, and the likelihood of having a relatively small number of radar units in close proximity to each other, the independently randomized frequency hopping sequences possess a much lower probability for those units to transmit and receive the same frequency at the same time. Even if two units transmit and receive the same frequency at the same time, because the sequence is randomized, the systems are unlikely to remain synchronized, but rather each system will continue in its own frequency stepping order. Therefore, interference between two units operating in close proximity to each other is reduced, mitigated, or prevented.

Generating a random frequency hopping sequence for every frequency scan of each unit independently would result in minimizing of the probability of interference. However, generating a random sequence may be time consuming, and thus may be undesirable when a very fast frequency scan is required. As such, a random frequency hopping sequence may be generated for each unit, and that unit keeps using the same random sequence. While not the optimum, this significantly reduces probability of multiple units to transmit and receive the same frequency.

Figure 4A:
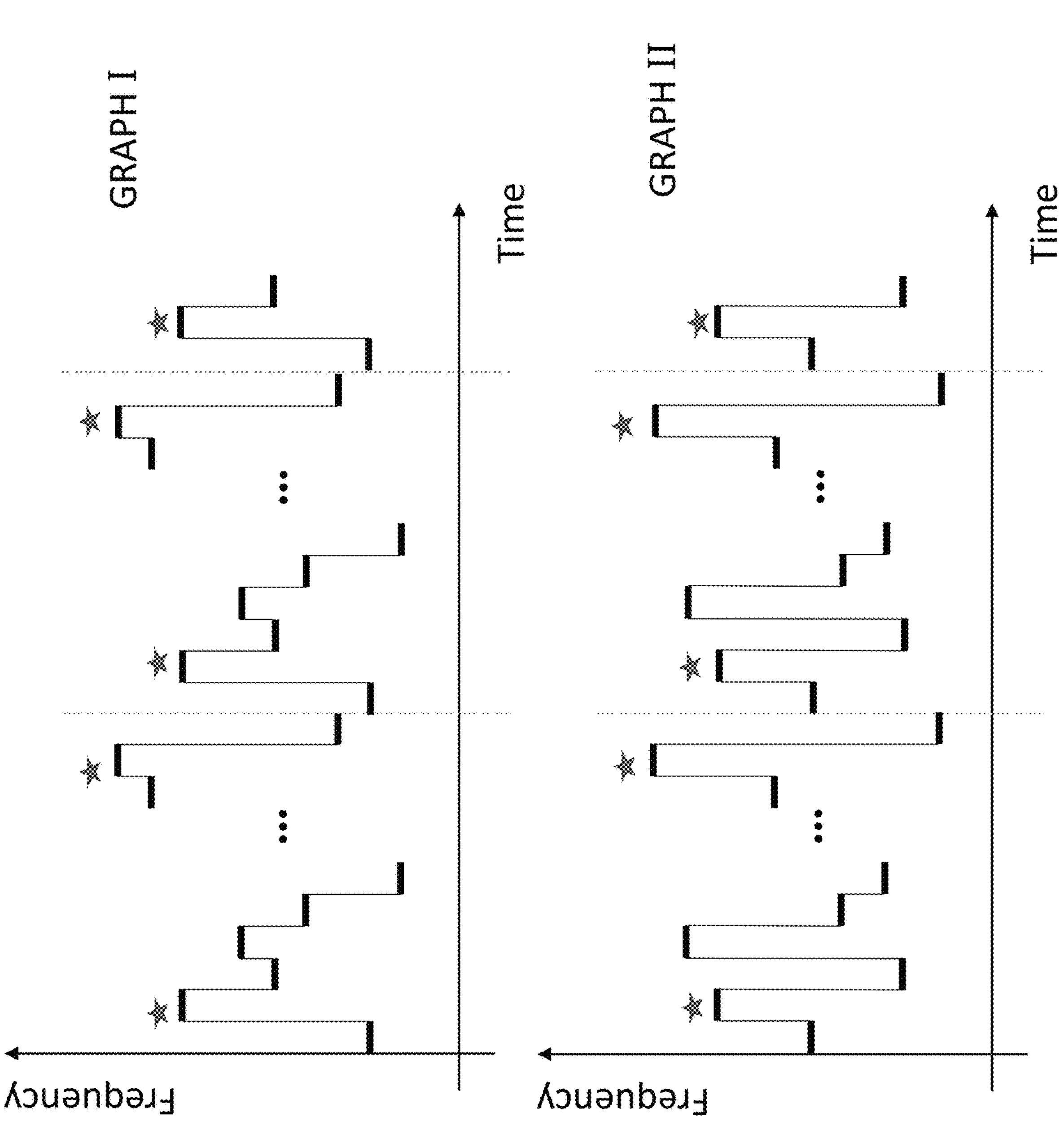
FIGS. 4A and 4B are graphic representations of additional and/or improved frequency stepping sequence of the SF radar according to embodiments of the disclosed technology.

When each unit repeats the same, randomized, frequency hopping sequence, if there are frequencies at which there is an interference between two or more units, that interference may continue to occur, or be repeated, in each scan of the frequency hopping sequence. For example, this can happen when the number N of frequency hops and the rate at which the frequencies are hopped (i.e. the total time at each "step" of the signal) are the same for the different units. Such repeated interference is illustrated, for example, in FIG. 4A, in which graph I represents the frequency of one machine, graph II represents the frequency of another machine, and the starred steps represent times at which the machines interfere with each other.

Figure 4B:
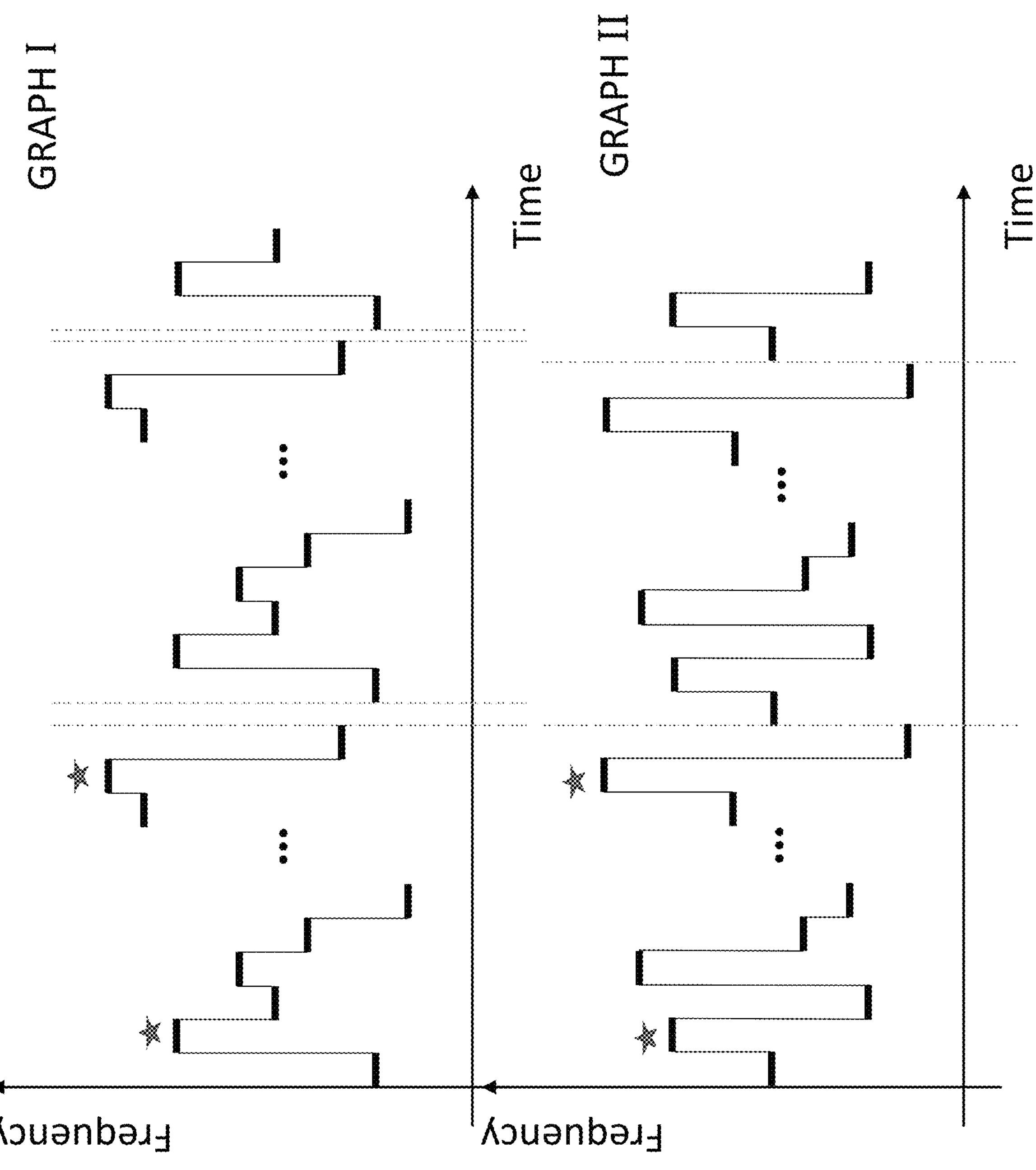

To prevent interference from repeatedly occurring in each frequency sweep, controller 102, or module 103 thereof, may add a random amount of time, or delay duration, between each pair of adjacent frequency scans. The delay duration can be randomly changed for each scan, in each machine, by controller 102 or module 103. The delay durations change the timing of the frequency scan, resulting in misalignment between the scans of the same frequency by the two machines, and preventing the units from repeated synchronizing. For example, in FIG. 4B, the signal of one machine, shown in graph I, has been modified to include random delay durations (indicated by time regions separated by a pair of dashed lines having no signal line therebetween), while the signal of the other machine, shown in graph II, remains unchanged. Occurrences in which the two machines use the same frequency are indicated by a star. As seen, the two machines synchronize once, and subsequently the synchronization is "missed" because of the delay duration in Graph I.

Figure 5:
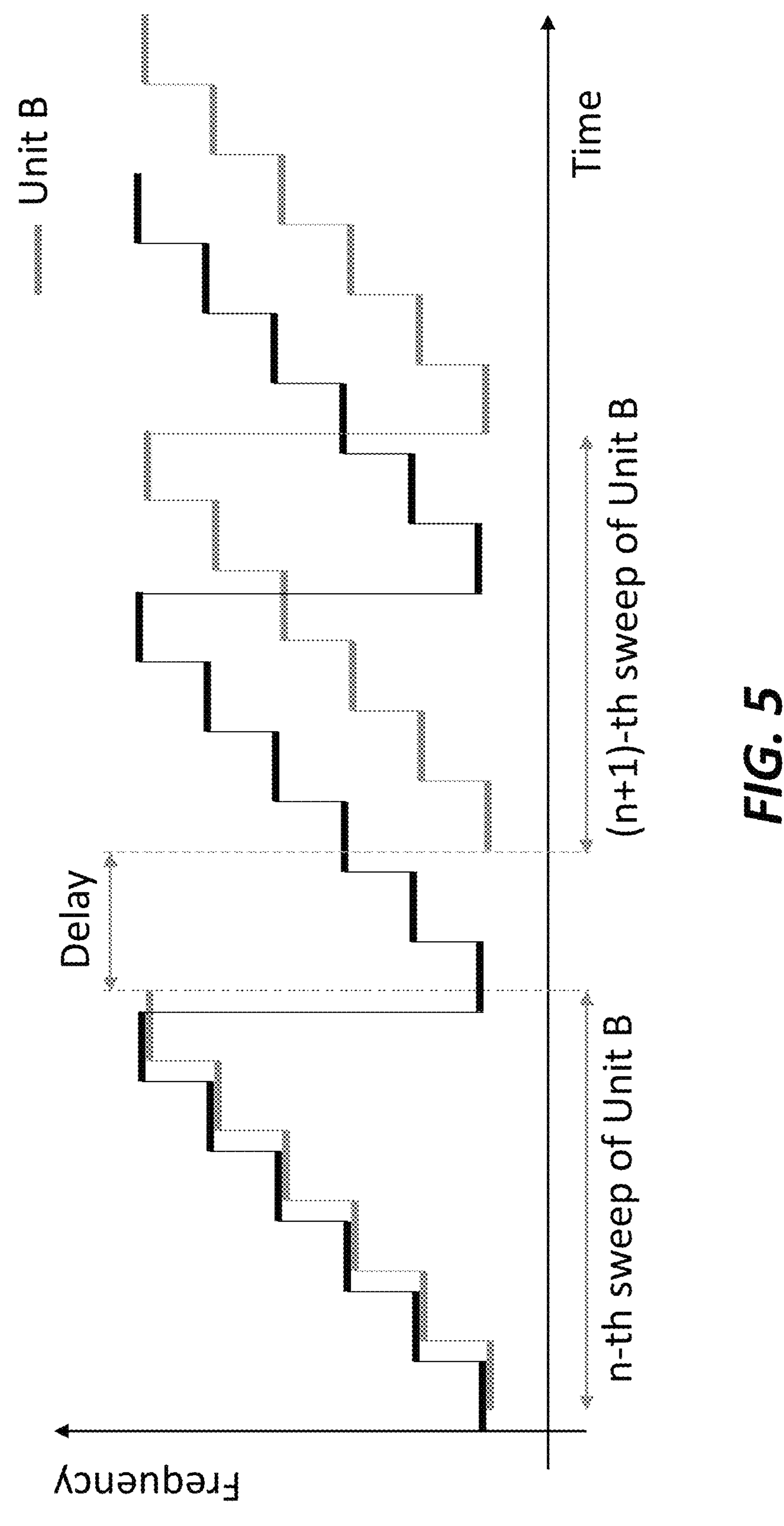
FIG. 5 is a graphic representation of an improved frequency stepping sequence of a prior art SF radar system according to embodiments of the disclosed technology.

Alternately or additionally, at the beginning of the operation, the frequency scan can be performed once with the transmitter turned off. The collected data may then be checked by controller 102, or by module 103 thereof, to determine whether or not interference is observed. If interference is observed, module 103 of controller 102 adds a certain amount of time, or a delay duration, prior to reactivation of the transmitter. FIG. 5 illustrates this type of signal, where detection of interference between unit A and unit B results in addition of the delay duration between the n-th and (n+1)-th scan of unit B, thereby making the two units be out of synchronization, and preventing additional interference.

The process of observing interference, and adding a delay duration between scans to reduce or prevent such interference, may be repeated iteratively until interference is no longer observed. Additionally or alternately, also once it is determined that there is no further interference, the process of turning off the transmitter and observing whether or not there is interference may be repeated, for example once every pre-defined duration.

The process of identifying whether there is an interference, and shifting the timing of frequency scans on a unit, is advantageous as it does not require any form of communication between the units. All that is required is that controller 102 be capable of determining the presence of interference, be able to activate and deactivate operation of the transmitting antenna, and add the delay duration.

Even when the mechanisms described hereinabove are employed, there is still a possibility of interference between radar systems, for example depending on operating parameters of the systems. For example, the number of possible frequency step orders is dependent on the number of frequencies used. When a smaller number of frequencies is used, there are fewer options for ordering the steps, yielding a higher possibility of interference.

An additional measure may be taken to mitigate the influence of the interference. Specifically, module 103 of controller 102 may randomly generate an initial phase shift for every scan and every frequency hopping, and may add the phase shift to the baseband signals. Typically, the same random phase shift would be added to both the data and the reference channel baseband signals. Thus, during processing of the signals, when controller 102 divides the baseband signal samples of the data channel by those of the reference channels, the random initial phase shift is canceled.

The initial phase is, naturally, not added to interfering components of the signal. Those components may have a different initial phase, generated by the unit which generated the interfering components. Consequently, during processing of the received signals, the initial phase used with respect to the interfering component is not cancelled. Thus, interfering components at different frequencies, for all of which the initial phase remains. Because the initial phases are randomly generated, the interfering components do not retain the expected phase relationship, and therefore the components are incoherent and do not form a pulse but rather spread over the time axis of the reconstructed time-domain signals. Thus, the influence of interference can be mitigated. The influence of interference may be further reduced by performing the measurement multiple times and taking the average, in particular because the interfering component is phase incoherent.

To use this methodology, system 100 must generate baseband signals with randomly generated initial phases for every frequency hopping. Such signals which may be controlled and generated by controller 102, for example by module 103 thereof. Moreover, to cancel the random initial phase of the unit's own baseband signals, and cause the interference signals to be incoherent, RF transceiver 104 must be a multi-channel transceiver having a data channel and a reference channel as described hereinabove.

Various embodiments of the disclosed d technology described hereinabove may be effective also in reducing or preventing interference from external noise signals (e.g. for telecommunications and broadcasting), particularly with signals having a constant repetition rate.

Figure 6:
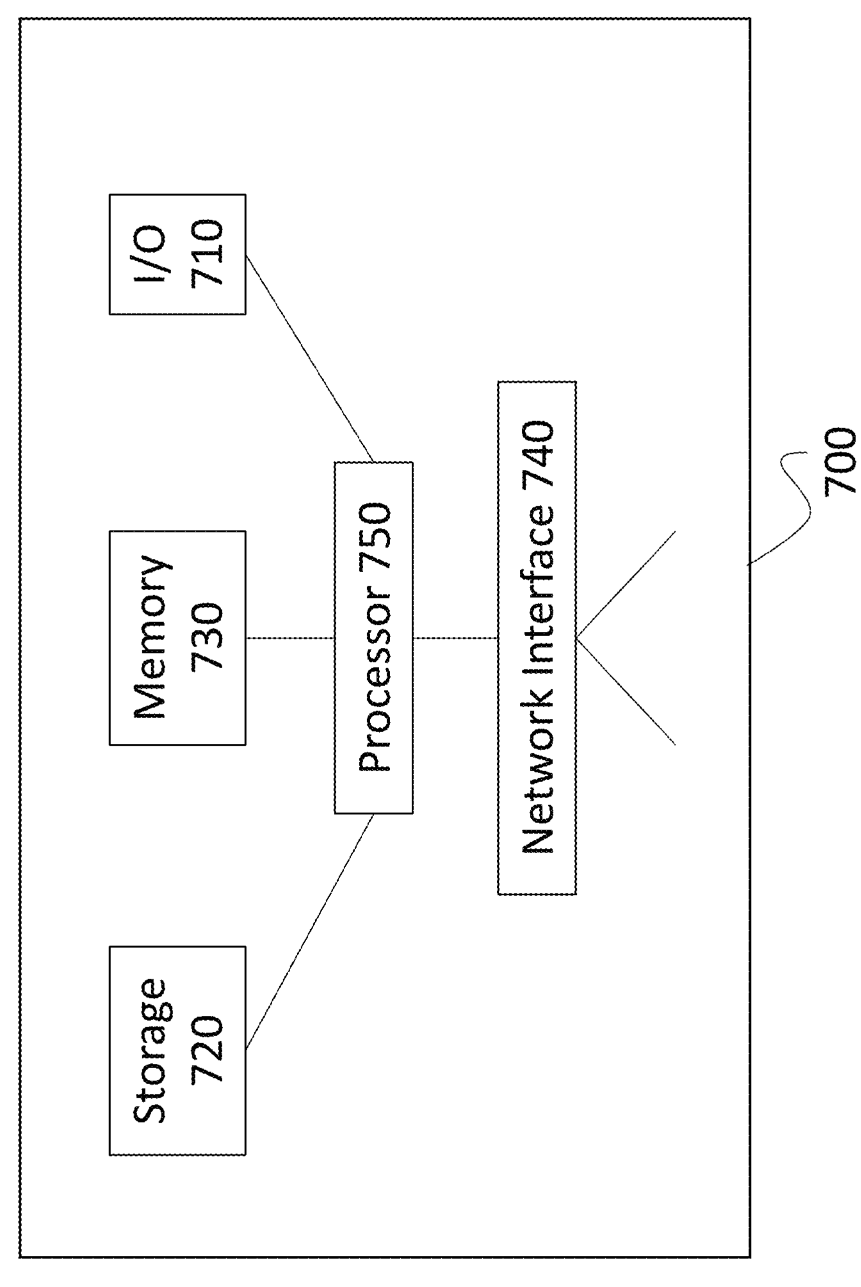
FIG. 6 shows a high-level block diagram of a device that may be used to carry out the disclosed technology.

FIG. 6 shows a high-level block diagram of a device that may be used to carry out the disclosed technology. Device 700 includes a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A device 700 also includes one or a plurality of input network interfaces for communicating with other devices via a network (e.g., the internet). A device 700 also includes one or more output network interfaces 710 for communicating with other devices. Device 700 also includes input/output 740 representing devices which allow for user interaction with the computer 700 (e.g., display, keyboard, mouse, speakers, buttons, etc.). One skilled in the art will recognize that an implementation of actual devices will contain other components as well, and that FIG. 6 is a high-level representation of some of the components of such a measurement device for illustrative purposes. It should also be understood by one skilled in the art that the method and devices depicted in FIGS. 2 through 5 may be implemented on a device such as is shown in FIG. 6.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A stepped frequency continuous wave (SFCW) radar system, comprising:
- a multi-channel radio frequency (RF) transceiver;
- a transmitting antenna transmitting a plurality of output signals from the multi-channel RF transceiver, the plurality of output signals comprising a plurality of signal scans, each signal scan including multiple output signals each having a specific frequency selected from a predetermined group of frequencies;
- a receiving antenna providing to the multi-channel RF transceiver input signals received thereby; and
- a controller, controlling generation of the output signals to be transmitted by the multi-channel RF transceiver, and processing the input signals provided by the multi-channel RF transceiver, the controller comprising a stepping modification module for randomizing an order of said multiple output signals having frequencies from the predetermined group of frequencies, in order to reduce or prevent interference in said multiple output signals, wherein the stepping modification module randomizes the order of said multiple output signals once to generate a randomized order, and the randomized order is used in each of said plurality of signal scans.

2. The SFCW radar system of claim 1, wherein the multi-channel RF transceiver includes, in at least one channel:
- a digital to analog (D/A) converter sampling a signal generated by the controller;
- a transmitter local oscillator generating an oscillator signal;
- a mixer mixing the sample with the oscillator signal to up-convert the signal generated by the controller to an RF frequency, the mixer providing the up-converted signal to the transmitting antenna for transmission thereof.

3. The SFCW radar system of claim 1, wherein the multi-channel RF transceiver includes, in at least one channel:
- a mixer mixing an input signal received by the receiving antenna with a signal provided by a receiver local oscillator to down-convert the received input signal to a baseband frequency signal;
- a filter filtering the baseband frequency signal; and
- an analog to digital (A/D) converter sampling the baseband frequency signal and providing the sample to the controller.

4. The SFCW radar system of claim 3, wherein, in a data channel of the multi-channel RF transceiver, the input signal received by the receiving antenna comprises reflections from targets at which the transmission from the transmitting antenna was directed.

5. The SFCW radar system of claim 1, wherein, in a reference channel of the multi-channel RF transceiver, the input signal received by the receiving antenna comprises the signal transmitted from the transmitting antenna.

6. The SFCW radar system of claim 1, wherein the controller reduces or mitigates interference from signals from a second SFCW radar system, and wherein the stepping modification module communicates with the second SFCW radar system to ensure that the randomized order is different from an order generated by the second SFCW radar system.

7. The SFCW radar system of claim 1, wherein the stepping modification module additionally adds a random delay duration between two adjacent signals scans of said plurality of signal scans.

8. The SFCW radar system of claim 7, wherein the stepping modification module adds the random delay duration between each pair of adjacent signals scans of said plurality of signal scans.

9. The SFCW radar system of claim 7, wherein the controller detects interference with signals received by the receiving antenna, and the stepping modification module adds said random delay duration between a single pair of adjacent signals scans of said plurality of signal scans, in response to the controller detecting the interference.

10. The SFCW radar system of claim 9, wherein the controller deactivates the transmitting antenna during detection of the interference, and reactivates the transmitting antenna following addition of the random delay duration.

11. The SFCW radar system of claim 1, wherein the stepping modification module additionally sets a random initial phase shift for said plurality of signals transmitted by the transmitting antenna, and wherein during processing of received signals, the controller eliminates the random initial phase shift of signals generated by the system and does not eliminate any phase shift of interference signals, thereby rendering the interference signals incoherent.

12. A method for preventing interference between signals of a stepped frequency continuous wave (SFCW) radar system and signals of another radar system, the method comprising:

generating a randomized order of a set of frequencies selected from a predetermined group of frequencies to be used by output signals of the SFCW radar system;

transmitting a plurality of output signals from a multi-channel RF transceiver of the SFCW radar system, the plurality of output signals comprising a plurality of signal scans, each signal scan including an output signal in each frequency of said set of frequencies, said frequencies of said output signals being in accordance with the randomized order;

receiving at the multi-channel RF transceiver a plurality of input signals; and processing the input signals provided by the multi-channel RF transceiver.

13. The method of claim 12, wherein the receiving comprises, in a data channel of the multi-channel RF transceiver, receiving as the plurality of input signals a plurality of reflections from targets at which the transmitted output signals were directed.

14. The method of claim 12, wherein the receiving comprises, in a reference channel of the multi-channel RF transceiver, receiving as the plurality of input signals the transmitted output signals.

15. The method of claim 12, further comprising communicating with the another radar system to ensure that the randomized order is different from a frequency order generated by the another radar system.

16. The method of claim 12, further comprising adding a random delay duration between two adjacent signals scans of said plurality of signal scans.

17. The method of claim 16, wherein the adding comprises:

deactivating transmission of the output signals;

detecting interference with signals received by the receiving antenna;

adding said random delay duration between a single pair of adjacent signals scans of said plurality of signal scans, in response to detecting the interference; and reactivating transmission of the output signals following addition of the random delay duration.

18. The method of claim 12, further comprising:

setting a random initial phase shift for the transmission of said plurality of signals; and during the processing of the input signals, eliminating the random initial phase shift of signals generated by the SFCW radar system and not eliminating any phase shift of interference signals, thereby rendering the interference signals incoherent.

19. A stepped frequency continuous wave (SFCW) radar system, comprising:

a multi-channel radio frequency (RF) transceiver including a reference channel;

a transmitting antenna transmitting a plurality of output signals from the multi-channel RF transceiver, the plurality of output signals comprising a plurality of signal scans, each signal scan including multiple output signals each having a specific frequency selected from a predetermined group of frequencies;

a receiving antenna providing to the multi-channel RF transceiver input signals received thereby; and a controller, controlling generation of the output signals to be transmitted by the multi-channel RF transceiver, and processing the input signals provided by the multi-channel RF transceiver, the controller comprising a stepping modification module for randomizing an order of said multiple output signals having frequencies from the predetermined group of frequencies, within at least one of the plurality of signal scans, in order to reduce or prevent interference in said multiple output signals, wherein, in said reference channel, the input signal received by the receiving antenna comprises one of the plurality of output signals transmitted from the transmitting antenna.

* * * * *